(12) United States Patent
Mu

(10) Patent No.: US 11,924,121 B2
(45) Date of Patent: Mar. 5, 2024

(54) DATA TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 598 days.

(21) Appl. No.: 17/152,278

(22) Filed: Jan. 19, 2021

(65) Prior Publication Data

US 2021/0143947 A1    May 13, 2021

Related U.S. Application Data

(63) Continuation of application No. PCT/CN2018/096019, filed on Jul. 17, 2018.

(51) Int. Cl.
*H04L 5/00* (2006.01)
*H04W 4/70* (2018.01)

(52) U.S. Cl.
CPC .......... *H04L 5/0007* (2013.01); *H04L 5/0094* (2013.01); *H04W 4/70* (2018.02)

(58) Field of Classification Search
CPC ... H04L 5/0007; H04L 5/0094; H04L 5/0044; H04L 5/14; H04L 67/12; H04W 4/70; H04W 72/0453
See application file for complete search history.

(56) References Cited

U.S. PATENT DOCUMENTS 9,936,506 B2     4/2018 Kim et al.
2007/0133388 A1*  6/2007 Lee ........................ H04B 7/155
                                                              370/328
(Continued)

FOREIGN PATENT DOCUMENTS

CA     3 001 807 A1     5/2017
CN     106797305 A      5/2017
(Continued)

OTHER PUBLICATIONS

Nokia 3GPP TSG-RAN WG1 Meeting #82bis—R1-155132 Retuning Gaps for MTC Oct. 2015 (Year: 2015).*

(Continued)

*Primary Examiner* — Rina C Pancholi
(74) *Attorney, Agent, or Firm* — Oblon, McClelland, Maier & Neustadt, L.L.P.

(57) ABSTRACT

The present disclosure relates to a data transmission method and apparatus. The method can include, in response to performing resource mapping on a physical downlink channel, mapping data symbols to a data transmission symbol and an adjustment symbol of a target sub-frame containing the adjustment symbol. The target sub-frame is a last sub-frame before performing a frequency adjustment or an uplink/downlink switching and/or a first sub-frame after performing the frequency adjustment or the uplink/downlink switching. The data transmission symbol is an orthogonal frequency division multiplexing (OFDM) symbol for transmitting data, and the adjustment symbol is an OFDM symbol used for an adjustment time of a narrowband frequency adjustment or an adjustment time of the uplink/downlink switching. The method can further include transmitting the data symbol in the adjustment symbol or disabling transmission of the data symbol in the adjustment
(Continued)

symbol when performing data transmission in the target sub-frame.

17 Claims, 6 Drawing Sheets

(56) References Cited

U.S. PATENT DOCUMENTS

2017/0208590 A1* 7/2017 Kim .................. H04L 5/001
2019/0081658 A1* 3/2019 Yamamoto ............... H04L 1/08

FOREIGN PATENT DOCUMENTS

JP          2012-175258 A     9/2012
WO    WO 2017/077694 A1    5/2017

OTHER PUBLICATIONS

Office Action dated Feb. 15, 2022 in corresponding Japanese Patent Application No. 2021-502441 (with English Translation), 8 pages.
Office Action dated Jan. 19, 2022 in corresponding Indian Patent Application No. 202147005548 (with English Translation), 6 pages.
Huawei, HiSilicon, "Bandwidth part activation and adaptation" [online],3GPP TSG RAN WG1 #90, R1-1712155, 7 pages Internet<URL:http://www.3gpp.org/ftp/tsg_ran/WG1_RL1/TSGR1_90/Docs/R1 -1712155.zip >.
International Search Report and Written Opinion of the International Searching Authority dated Apr. 22, 2019 in PCT/CN2018/096019, (with English translation), 12 pages.
International Preliminary Report on Patentability dated Jan. 19, 2021 in PCT/CN2018/096019, 7 pages.
"Retuning Gaps for MTC" Nokia Networks, 3GPP TSG-RAN WG1 Meeting #82bis, R1-155132, Jul. 5, 2018, 6 pages.
"3rd Generation Partnership Project;Technical Specification Group Radio Access Network; Evolved Universal Terrestrial Radio Access (E-UTRA); Physical channels and modulation (Release 15)" 3GPP TS 36.211 V15.2.0, Jul. 5, 2018, 236 pages.

* cited by examiner

DATA TRANSMISSION METHOD AND APPARATUS, AND STORAGE MEDIUM

CROSS-REFERENCE TO RELATED APPLICATION

This application is a U.S. application based on International Application No. PCT/CN2018/096019, filed on Jul. 17, 2018. The entire disclosure of the prior application is hereby incorporated by reference in its entirety.

TECHNICAL FIELD

The present disclosure relates to a field of communication technology, including to a data transmission method, a data transmission apparatus, and a storage medium.

BACKGROUND

A Machine Type Communication (MTC) refers to a communication between machines without human intervention, which is widely applied to smart cities (such as meter reading), smart agriculture (such as collection of temperature, humidity and other information), and smart transportation (such as bicycle/car sharing) and other fields. At present, a basic MTC communication framework is formed in the Long Term Evolution (LTE) system (mainly in release 12-release 13), which may provide advantages, such as low complexity, low cost, coverage enhancement, and power saving. The traditional MTC system, which may be referred to as in-band MTC, is deployed in LTE frequency bands, and shares frequency resources and some channels with users of the traditional LTE system. Since the in-band MTC system is deployed in the LTE frequency bands, it is required for resource mapping to consider existing channel coexistence with LTE. When performing the resource mapping on the MTC downlink channels, such as MTC Physical Downlink Control Channel (MPDCCH) and MTC Physical Downlink Shared Channel (MPDSCH), it is mainly considered that the resource mapping is not performed in the existing control channel region, i.e., the physical resources occupied by first three Orthogonal Frequency Division Multiplexing (OFDM) symbols and a Cell-specific Reference Signal (CRS) of a sub-frame.

Low complexity/low cost in the MTC system is achieved by limiting a communication bandwidth of an MTC terminal. Generally, the MTC system may support communication bandwidth of six physical resource blocks (PRBs). In order to support a narrowband communication of the MTC system, entire system bandwidth is divided into multiple narrow bands (NBs) in release 13, and only one of the narrow bands may be used by a user to send or receive at a certain time. An adjustment on receiving/transmitting frequency (i.e., RF retuning) is needed at this time when communicating in a further narrow band. Some processing time is required when the receiving/transmitting of the user of the MTC system is adjusted from one narrow band to another or when an uplink/downlink switching is performed in an MTC Time Division Duplexing (TDD) system.

In previous discussions of the 3rd Generation Partnership Project (3GPP), it has been agreed that a time duration of two OFDM symbols is required for such RF retuning (for example, the frequency adjustment or the uplink/downlink switching). During this time duration, users cannot receive or send data. Since it is required to consider existing channel coexistence with the traditional LTE in the in-band MTC system, the MTC signals cannot be mapped to a control channel region of the traditional LTE. Therefore, first two OFDM symbols in control channel region of the traditional LTE are reserved for the narrowband switching time in downlink communication, or an adjustment time of the uplink/downlink switching in the TDD system.

However, given that there is lack of flexibility in the way of deploying the current MTC system based on the LTE system, the industry has begun (in release 16) at present to consider an independent deployment of the MTC system, such as allocating independent spectrums and dedicated channels/signals for the independently deployed MTC system. Since the independently deployed MTC does not depend on the LTE system, it is unnecessary to consider the channel coexistence with the LTE system. Therefore, in the independent deployment mode, the MPDCCH and MPDSCH for users of the MTC system in release 16 (or a part of users of the MTC system in release 16) may support a usage of the first three OFDM symbols.

However, since the first two OFDM symbols in control channel region of either the traditional in-band MTC system or the LTE are served for an adjustment time of a narrowband adjustment and an adjustment time of the uplink/downlink switching in the TDD system, there can be difficulty in determining how to set the adjustment time of the narrowband frequency adjustment or the adjustment time of the uplink/downlink switching when this region is occupied by the MPDCCH and MPDSCH in the independently deployed MTC system.

SUMMARY

Aspects of the present disclosure provide a data transmission method, a data transmission apparatus, and a storage medium.

According to a first aspect of the present disclosure, a data transmission method applicable to a base station is provided. The method can include mapping data symbols to a data transmission symbol and an adjustment symbol of a target sub-frame containing the adjustment symbol in response to performing resource mapping on a physical downlink channel, in which the target sub-frame is a last sub-frame before performing a frequency adjustment or an uplink/downlink switching and/or a first sub-frame after performing the frequency adjustment or the uplink/downlink switching. The data transmission symbol can be an OFDM symbol for transmitting data and the adjustment symbol can be an OFDM symbol used for an adjustment time of a narrowband frequency adjustment or an adjustment time of the uplink/downlink switching. The method can further include transmitting the data symbol in the adjustment symbol or disabling transmission of the data symbol in the adjustment symbol when performing data transmission in the target sub-frame.

According to a second aspect of the present disclosure, a data transmission method is provided. The method can include disabling reception of a data symbol in an adjustment symbol in a target sub-frame when performing data reception of the target sub-frame containing the adjustment symbol. The target sub-frame can be a last sub-frame before performing a frequency adjustment or an uplink/downlink switching and/or a first sub-frame after performing the frequency adjustment or the uplink/downlink switching. The adjustment symbol can be an OFDM symbol used for an adjustment time of a narrowband frequency adjustment or an adjustment time of the uplink/downlink switching. The method can further include padding with a preset value at a position in analyzed data of the target sub-frame that corresponds to the adjustment symbol during data analysis.

According to a third aspect of the present disclosure, a data transmission apparatus applicable to a base station is provided. The apparatus can include a resource mapping module that is configured to map data symbols to a data transmission symbol and an adjustment symbol of a target sub-frame containing the adjustment symbol in response to performing resource mapping on a physical downlink channel; in which, the data transmission symbol is an OFDM symbol for transmitting data, and the adjustment symbol is an OFDM symbols used for an adjustment time of a narrowband frequency adjustment or an adjustment time of the uplink/downlink switching; and a data transmission module that is configured to transmit the data symbol in the adjustment symbol or disable transmission of the data symbol in the adjustment symbol when performing data transmission in the target sub-frame.

According to a fourth aspect of embodiments of the present disclosure, a data transmission apparatus applicable to a user device is provided. The apparatus can include a receiving module that is configured to disable reception of a data symbol in an adjustment symbol in a target sub-frame when performing data reception of the target sub-frame containing the adjustment symbol. The target sub-frame can be a last sub-frame before performing a frequency adjustment or an uplink/downlink switching and/or a first sub-frame after performing the frequency adjustment or the uplink/downlink switching. The adjustment symbol can be an OFDM symbol used for an adjustment time of a narrowband frequency adjustment or an adjustment time of the uplink/downlink switching. The apparatus can further include a data analysis module that is configured to pad with a preset value at a position in analyzed data of the target sub-frame that corresponds to the adjustment symbol during data analysis.

According to a fifth aspect of the present disclosure, a data transmission device applicable to a base station is provided. The device can include a processor and a memory configured to store instructions executable by the processor. The processor can be configured to map data symbols to a data transmission symbol and an adjustment symbol of a target sub-frame containing the adjustment symbol in response to performing resource mapping on a physical downlink channel. The target sub-frame can be a last sub-frame before performing a frequency adjustment or an uplink/downlink switching and/or a first sub-frame after performing the frequency adjustment or the uplink/downlink switching. The data transmission symbol can be an OFDM symbol for transmitting data, and the adjustment symbol is an OFDM symbol used for an adjustment time of a narrowband frequency adjustment or an adjustment time of the uplink/downlink switching. Further, the processor can transmit the data symbol in the adjustment symbol or disable transmission of the data symbol in the adjustment symbol when performing data transmission in the target sub-frame.

According to a sixth aspect of the present disclosure, a non-transitory computer-readable storage medium having computer program instructions stored thereon is provided. When the program instructions are executed by a processor, the steps of the method to access to the MCT system provided by the first aspect of the present disclosure are implemented.

According to a seventh aspect of the present disclosure, a data transmission device applicable to a user device is provided. The device can include a processor and a memory configured to store instructions executable by the processor. The processor is configured to disable reception of a data symbol in an adjustment symbol in a target sub-frame when performing data reception of the target sub-frame containing the adjustment symbol. The target sub-frame is a last sub-frame before performing a frequency adjustment or an uplink/downlink switching and/or a first sub-frame after performing the frequency adjustment or the uplink/downlink switching, and the adjustment symbol is an OFDM symbol used for an adjustment time of a narrowband frequency adjustment or an adjustment time of the uplink/downlink switching. The device can further include a pad with a preset value at a position in analyzed data of the target sub-frame that corresponds to the adjustment symbol during data analysis.

According to an eighth aspect of the present disclosure, a non-transitory computer-readable storage medium having computer program instructions stored thereon is provided. When the program instructions are executed by a processor, the steps of the method to access to the MCT system provided by the second aspect of the present disclosure are implemented.

It should be understood that the above general descriptions and the subsequent specific descriptions are only exemplary and explanatory, without any limitation to the present disclosure.

BRIEF DESCRIPTION OF THE DRAWINGS

The drawings herein are incorporated into the specification and constitute a part of the specification, show embodiments that conform to the present disclosure, and are used to explain the principle of the present disclosure together with the specification.

DETAILED DESCRIPTION

Exemplary embodiments will be described in detail here, and examples thereof are shown in the accompanying drawings. When the following descriptions refer to the drawings, unless otherwise indicated, the same numbers in different drawings indicate the same or similar elements. The implementations described in the following example embodiments do not represent all implementations consistent with the present disclosure. Rather, they are only examples of apparatuses and methods consistent with some aspects of the present disclosure as detailed in the appended claims.

Before introducing the data transmission method provided by the present disclosure, application scenarios involved in each embodiment of the present disclosure are introduced, which may include an MTC system that may be independently deployed. The independently deployed MTC system is configured with independent frequency spectrums, dedicated channels and signals. Physical channels of the MTC system are introduced here. The physical channels of the MTC system may include: an MTC Physical Downlink Control Channel (MPDCCH), an MTC Physical Downlink Shared Channel (MPDSCH), an MTC Physical Uplink Control Channel (MPUCCH), an MTC Physical Uplink Shared Channel (MPUSCH), in which the MPDCCH and MPUCCH are usually used to transmit control information, and the MPDSCH and MPUSCH are usually used to transmit data information. Based on the above application scenarios, the method to access to the MCT system provided by the present disclosure will be introduced below.

Figure 1:
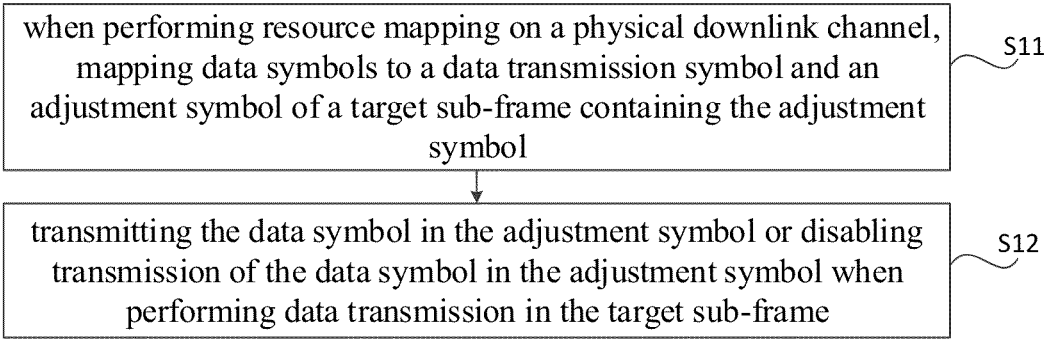
FIG. 1 is a flow chart illustrating a data transmission method according to an example embodiment.

FIG. 1 is a flow chart illustrating a data transmission method according to an example embodiment. The method is applied to a base station. As shown in FIG. 1, the method may include the followings.

At block S11, when performing resource mapping on a physical downlink channel, data symbols are mapped to a data transmission symbol and an adjustment symbol of a target sub-frame which contains the adjustment symbol.

The data transmission symbol is an OFDM symbol for transmitting data, the adjustment symbol is an OFDM symbol used for an adjustment time of a narrowband frequency adjustment or an adjustment time of an uplink/downlink switching. The target sub-frame may be a last sub-frame before performing the frequency adjustment or the uplink/downlink switching, and/or a first sub-frame after performing the frequency adjustment or the uplink/downlink switching. That is, the target sub-frame may be selected from at least one of the two sub-frames before and after performing the frequency adjustment or the uplink/downlink switching, as long as the selected target sub-frame may provide two OFDM symbols for the adjustment time of the narrowband frequency adjustment or the adjustment time of the uplink/downlink switching. It may be pre-defined in a protocol which sub-frame is selected as the target sub-frame. A basis for selecting the target sub-frame and the adjustment symbol may be set as required and be pre-defined in the protocol, so that the base station and user device may clearly know which sub-frame is the target sub-frame containing the adjustment symbol and the position of the adjustment symbol in a process of resource mapping, data transmission and receiving data by users.

In a system, a system frame may be composed of 10 sub-frames, each sub-frame may include two slots, and each slot may include 7 OFDM symbols. That is, each sub-frame may include 14 OFDM symbols. Since the first 3 OFDM symbols of the sub-frame do not need to be reserved for the adjustment time of the narrowband frequency adjustment or adjustment time of the uplink/downlink switching in an independently deployed MTC system, all the 14 OFDM symbols of each sub-frame may be used to transmit data in the independently deployed MTC system. The target sub-frame containing the adjustment symbol includes the data transmission symbol and the adjustment symbol. For example, assuming that the last sub-frame before performing the frequency adjustment or the uplink/downlink switching is configured as the target sub-frame and last two OFDM symbols of the last sub-frame are adjustment symbols, the first 12 OFDM symbols of the last sub-frame are data transmission symbols, which may be used for data transmission.

In addition, the physical downlink channel described above may include the MPDCCH and MPDSCH described above.

At block S12, when performing data transmission in the target sub-frame, the data symbol corresponding to the adjustment symbol is transmitted or transmission of the data symbol corresponding to the adjustment symbol is disabled.

The data symbol may be obtained by modulating the data to be sent, which may be understood as data that needs to be transmitted by means of the mapped OFDM symbol. In this embodiment, the data symbol may still be mapped to the adjustment symbol when performing resource mapping on the physical downlink channel, while transmission of the data symbol in the adjustment symbol may be disabled when performing data transmission. Or, in some cases, the data symbol corresponding to the adjustment symbol may still be transmitted, for example in case that the adjustment symbol may contain a reference symbol of some cells that may be directed to multiple users, the base station needs to continue transmitting the data symbol corresponding to the adjustment symbol.

The above technical solution provides a scheme of setting an adjustment time of the narrowband frequency adjustment or an adjustment time of the uplink/downlink switching for the independently deployed MTC system and a data transmission method for such scheme, which may solve the problem that the adjustment time of the narrowband frequency adjustment or the adjustment time of the uplink/downlink switching cannot be configured when a control channel region is occupied by the MPDCCH and MPDSCH in the independently deployed MTC system.

A method for configuring the target sub-frame and the adjustment symbol will be described below. In a first implementation, it may be pre-defined in the protocol which sub-frame is selected as the target sub-frame and which OFDM symbol in the target sub-frame is determined as the adjustment symbol. There are may be three situations as follows.

Figure 2A:
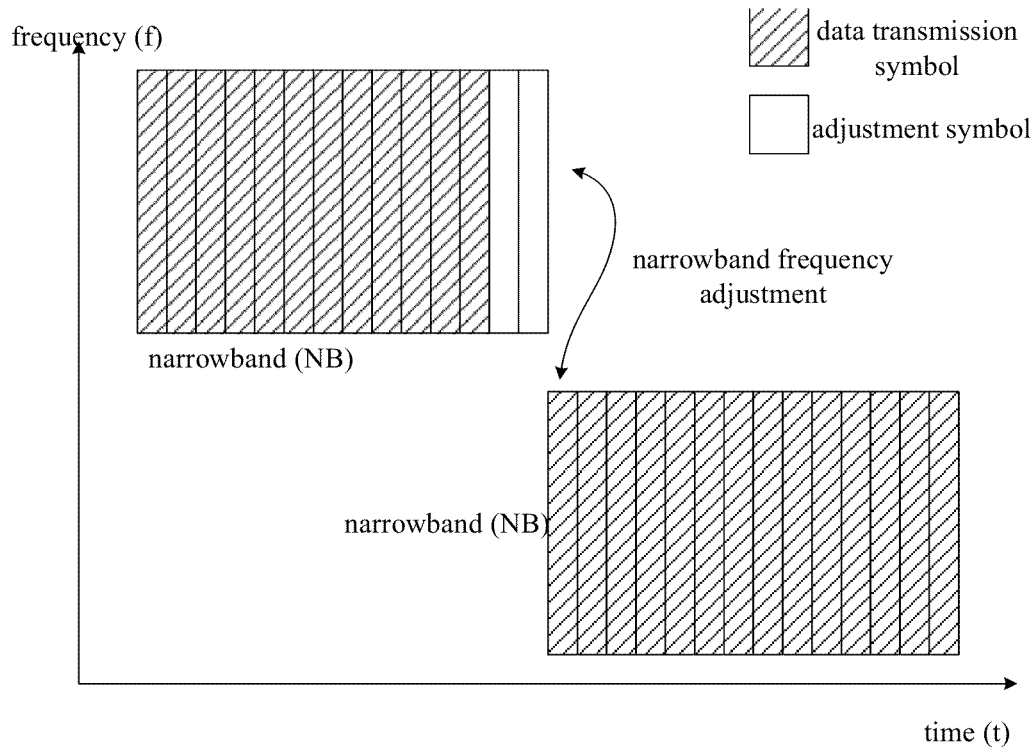
FIG. 2a is a schematic diagram illustrating positions of adjustment symbols according to an example embodiment of the present disclosure.

The last sub-frame before performing the frequency adjustment or the uplink/downlink switching is selected as the target sub-frame, and last two OFDM symbols of the last sub-frame are the adjustment symbols. FIG. 2a is a schematic diagram illustrating positions of the adjustment symbol according to an example embodiment of the present disclosure. As shown in FIG. 2a, taking the frequency adjustment as an example, the last two OFDM symbols of the last sub-frame before performing the frequency adjustment are the adjustment symbols.

Figure 2B:
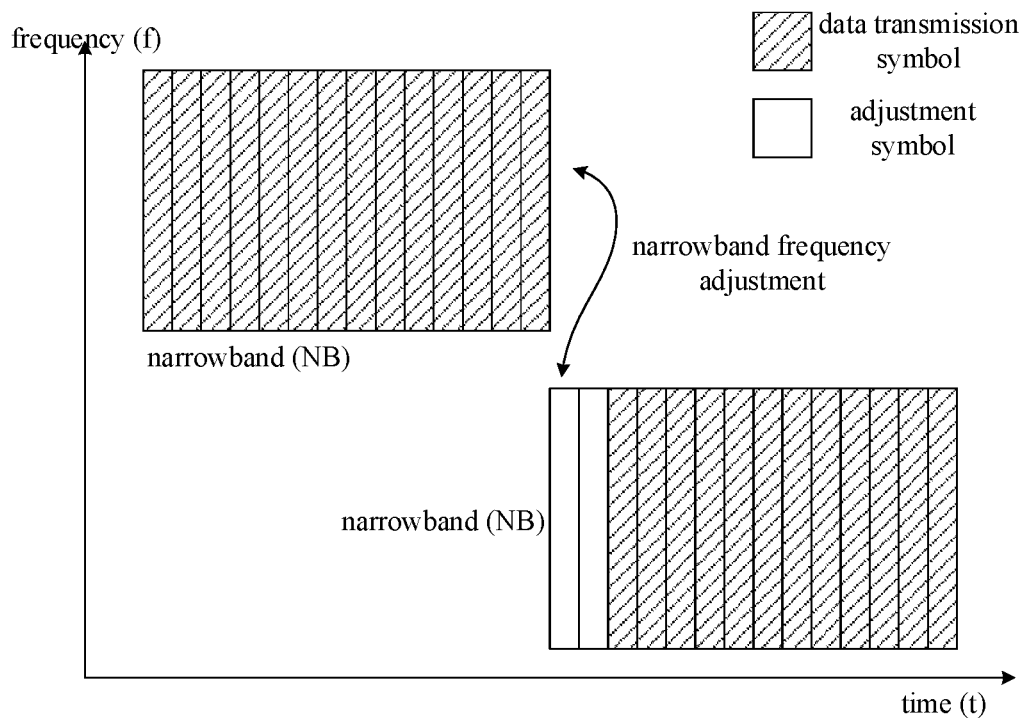
FIG. 2b is a schematic diagram illustrating positions of adjustment symbols according to another example embodiment of the present disclosure.

Alternatively, the first sub-frame after performing the frequency adjustment or the uplink/downlink switching is selected as the target sub-frame, and first two OFDM symbols of the first sub-frame are the adjustment symbols. FIG. 2b is a schematic diagram illustrating positions of the adjustment symbol according to another example embodiment of the present disclosure. As shown in FIG. 2b, taking the frequency adjustment as an example, the first two OFDM symbols of the first sub-frame after performing the frequency adjustment are the adjustment symbols.

Figure 2C:
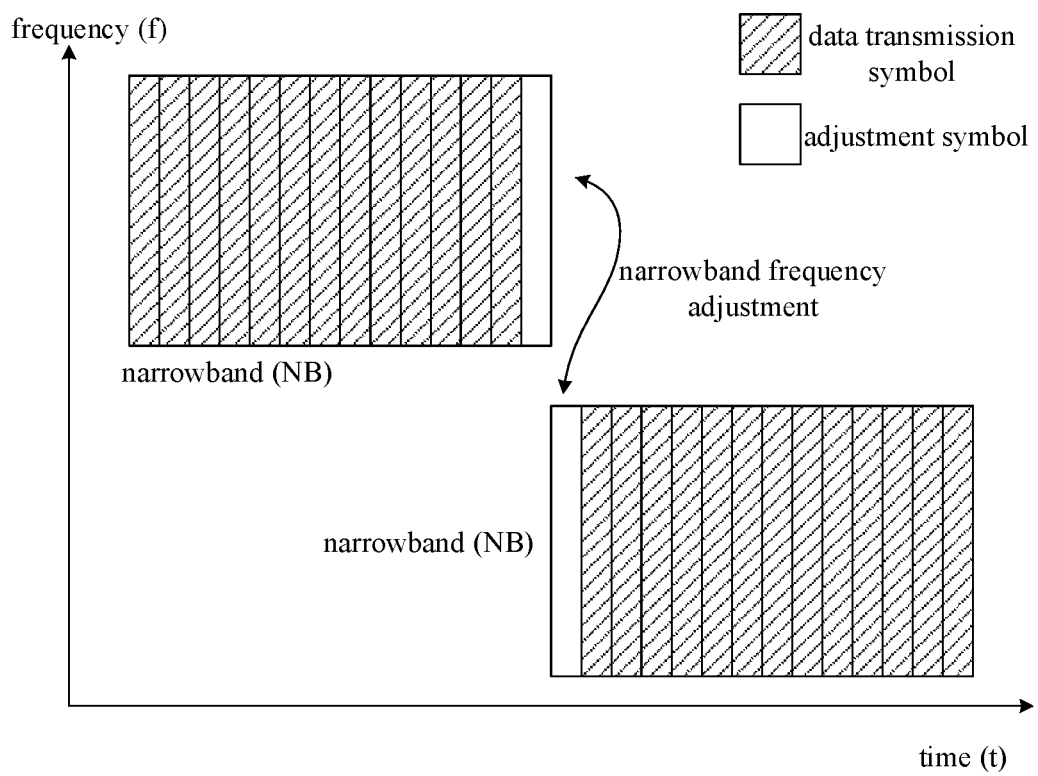
FIG. 2c is a schematic diagram illustrating positions of adjustment symbols according to a still example embodiment of the present disclosure.

Alternatively, both the last sub-frame before performing the frequency adjustment or the uplink/downlink switching and the first sub-frame after performing the frequency adjustment or the uplink/downlink switching are selected as the target sub-frame, and a last OFDM symbol of the last sub-frame and a first OFDM symbol of the first sub-frame are the adjustment symbols. FIG. 2c is a schematic diagram illustrating positions of adjustment symbols according to a further example embodiment of the present disclosure. As shown in FIG. 2c, taking the frequency adjustment as an example, the last OFDM symbol of the last sub-frame before performing the frequency adjustment and the first OFDM symbol of the first sub-frame after performing the frequency adjustment are the adjustment symbols.

Figure 3:
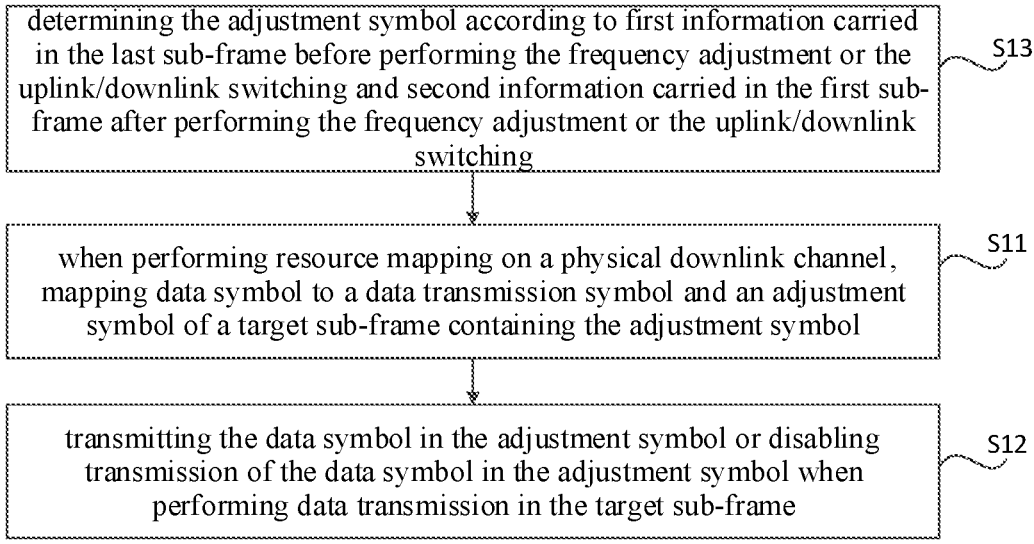
FIG. 3 is a flow chart illustrating a data transmission method according to another example embodiment.

In a second implementation, it is possible to determine which sub-frame is selected as the target sub-frame and to determine which OFDM symbol in this target sub-frame is used as the adjustment symbol according to information carried in the two sub-frames before and after performing the frequency adjustment or the uplink/downlink switching. FIG. 3 is a flow chart illustrating another data transmission method according to another example embodiment. The method is applied to a base station. As shown in FIG. 3, the data transmission method may further include the followings.

At block S13, the adjustment symbol is determined according to first information carried in the last sub-frame before performing the frequency adjustment or the uplink/downlink switching and second information carried in the first sub-frame after performing the frequency adjustment or the uplink/downlink switching.

The base station may select the same or different schemes based on whether the first information carried in the last sub-frame before performing the frequency adjustment or the uplink/downlink switching is the same as or different from the second information carried in the first sub-frame after performing the frequency adjustment or the uplink/downlink switching. The information that may be carried in the sub-frames before and after performing the frequency adjustment or the uplink/downlink switching may include: MPDCCH messages, MPUCCH messages, MPDSCH messages or MPUSCH messages. The MPDCCH and MPUCCH are usually used to transmit control information, and the MPDSCH and MPUSCH are usually used to transmit data information. The MPDCCH messages may be understood as messages or information carried in the MPDCCH (i.e., the messages or information transmitted by the MPDCCH). The MPUCCH messages, MPDSCH messages, and MPUSCH messages may be understood similarly to the MPDCCH messages.

Therefore, in a first implementation in which information types of the first information and the second information are different, the OFDM symbol carrying data information may be used as much as possible and thus the sub-frame carrying data information is selected. The block S13 may include determining the last sub-frame as the target sub-frame and last two OFDM symbols of the last sub-frame as the adjustment symbol when the first information is data information and the second information is control information, or determining the first sub-frame as the target sub-frame and first two OFDM symbols of the first sub-frame as the adjustment symbol when the first information is control information and the second information is data information.

The first and second information may be any of the MPDCCH message, MPUCCH message, MPDSCH message, and MPUSCH message. If the first or second information is the MPDCCH or MPUCCH message, the first or second information is the control information. If the first or second information is the MPDSCH or MPUSCH message, the first or second information is the data information. For example, Table 1 shows some cases where the first and second information are of different types, and the position of the adjustment symbol in each case.

TABLE 1

| information carried in the last sub-frame before performing the frequency adjustment or the uplink/downlink switching | information carried in the first sub-frame after performing the frequency adjustment or the uplink/downlink switching | OFDM symbol in the last sub-frame before performing the frequency adjustment or the uplink/downlink switching that may be used as the adjustment symbol | OFDM symbol in the first sub-frame after performing the frequency adjustment or the uplink/downlink switching that may be used as the adjustment symbol |
|---|---|---|---|
| MPDCCH message | MPDSCH message | none | $1^{st}$, $2^{nd}$ |
| MPDSCH message | MPDCCH message | $13^{th}$, $14^{th}$ | none |
| MPUSCH message | MPDCCH message | $13^{th}$, $14^{th}$ | none |

The $1^{st}$ and $2^{nd}$ in the above table 1 represent the first two OFDM symbols in the first sub-frame after performing the frequency adjustment or the uplink/downlink switching (see FIG. 2b which shows the positions of the adjustment symbols); and the $13^{th}$ and $14^{th}$ represent the last two OFDM symbols in the last sub-frame before performing the frequency adjustment or the uplink/downlink switching (see FIG. 2a which shows the positions of the adjustment symbols). In addition, the several cases shown in Table 1 are some cases when the information types of the first information and the second information are different, while the other cases are not listed here.

The symbol setting strategy described above may be pre-defined in the protocol. When the base station determines the data types of the information carried in the two sub-frames before and after performing the frequency adjustment or the uplink/downlink switching, the sub-frame which may be selected as the target sub-frame and the OFDM symbol in this target sub-frame that may be used as the adjustment symbol can be determined based on the above symbol setting strategy.

In a second implementation in which information types of the first information and the second information are identical, that is, both the information carried in the two sub-frames before and after the frequency adjustment or the uplink/downlink switching is data information or both the information carried in the two sub-frames before and after the frequency adjustment or the uplink/downlink switching is control information. The block S13 may include any one of the following three manners determining the last sub-frame as the target sub-frame and last two OFDM symbols of the last sub-frame as the adjustment symbol, determining the first sub-frame as the target sub-frame and first two OFDM symbols of the first sub-frame as the adjustment symbol, or determining the last sub-frame and the first sub-frame as the target sub-frame and a last OFDM symbol of the last sub-frame and a first OFDM symbol of the first sub-frame as the adjustment symbol.

The above three situations may refer to those shown in FIG. 2a to FIG. 2b, it may be pre-defined in the protocol which situation is adopted. That is, it is specified in the protocol: which sub-frame is selected as the target sub-frame and which OFDM symbol in this target sub-frame is determined as the adjustment symbol in case that both the information carried in the two sub-frames before and after performing the frequency adjustment or the uplink/downlink switching is data information or both the information carried in the two sub-frames before and after performing the frequency adjustment or the uplink/downlink switching is control information. In this way, the base station may determine the target sub-frame and the OFDM symbol in this target sub-frame that may be used as the adjustment symbol in case that both the information carried in the two sub-frames before and after performing the frequency adjustment or the uplink/downlink switching is data information or both the information carried in the two sub-frames before and after performing the frequency adjustment or the uplink/downlink switching is control information.

In a third implementation in which the same OFDM symbol positions may be selected for all combinations of the information carried in two sub-frames before and after performing the frequency adjustment or the uplink/downlink switching.

Accordingly, the block S13 may include: determining the adjustment symbol based on a first symbol setting strategy corresponding to the first information and the second information. The first symbol setting strategy is preset, and all combinations of the first information and the second information correspond to the first symbol setting strategy.

The first symbol setting strategy includes one of the following three situations: 1) the last sub-frame being the target sub-frame and the adjustment symbol being last two OFDM symbols of the last sub-frame; 2) the first sub-frame being the target sub-frame and the adjustment symbol being the first two OFDM symbols of the first sub-frame; or 3) the last sub-frame and the first sub-frame being the target sub-frame and the adjustment symbol being a last OFDM symbol of the last sub-frame and a first OFDM symbol of the first sub-frame.

It may be pre-defined in the protocol which of the above three situations is adopted as the first symbol setting strategy. When the base station determines the data types of the information carried in the two sub-frames before and after performing the frequency adjustment or the uplink/downlink switching, which sub-frame may be selected as the target sub-frame and which the OFDM symbol in the target sub-frame may be used as the adjustment symbol can be determined based on the above first symbol setting strategy.

For example, the first and second information may be any of the MPDCCH message, MPUCCH message, MPDSCH message, and MPUSCH message. In this embodiment, the same symbol setting strategy may be set regardless of the combination of two messages selected for the first and second information. As an example, Table 2 shows some cases where the first information and the second information are identical or different, and the position of the adjustment symbol in each case.

TABLE 2

| information carried in the last sub-frame before performing the frequency adjustment or the uplink/downlink switching | information carried in the first sub-frame after performing the frequency adjustment or the uplink/downlink switching | OFDM symbol in the last sub-frame before performing the frequency adjustment or the uplink/downlink switching that may be used as the adjustment symbol | OFDM symbol in the first sub-frame after performing the frequency adjustment or the uplink/downlink switching that may be used as the adjustment symbol |
| --- | --- | --- | --- |
| MPDCCH message | MPDCCH message | $14^{th}$ | $1^{st}$ |
| MPDSCH message | MPDSCH message | | |
| MPUCCH message | MPDCCH message | | |
| MPUSCH message | MPDSCH message | | |

The $1^{st}$ in the above table 2 represents the first OFDM symbol in the first sub-frame after performing the frequency adjustment or the uplink/downlink switching, and the $14^{th}$ represents the last OFDM symbol in the last sub-frame before performing the frequency adjustment or the uplink/downlink switching (see FIG. 2c which shows the positions of the adjustment symbols). As shown in Table 2, no matter which combination is selected for the information carried in the two sub-frames before and after performing the frequency adjustment or the uplink/downlink switching, the adjustment symbols are the first OFDM symbol in the first sub-frame and the last OFDM symbol in the last sub-frame. In addition, the several cases shown in Table 2 merely present a part of combinations of the first information and the second information, and the same symbol setting strategy is also suitable for other cases, which are not listed here. It is also exemplary that the adjustment symbols are the first OFDM symbol in the first sub-frame and the last OFDM symbol in the last sub-frame. For example, the adjustment symbols may be the first two OFDM symbols in the first sub-frame or the last two OFDM symbols in the last sub-frame.

In a fourth implementation in which different OFDM symbol positions may be selected for different combinations of the information carried in the two sub-frames before and after performing the frequency adjustment or the uplink/downlink switching.

Accordingly, the block S13 may include determining the adjustment symbol based on a first symbol setting strategy corresponding to the first information and the second information; in which the first symbol setting strategy is preset, different combinations of the first information and the second information correspond to different symbol setting strategies respectively, and the first symbol setting strategy is any one of the different symbol setting strategies.

The first symbol setting strategy includes one of the following three situations: 1) the last sub-frame being the target sub-frame and the adjustment symbol being last two OFDM symbols of the last sub-frame; 2) the first sub-frame being the target sub-frame and the adjustment symbol being the first two OFDM symbols of the first sub-frame; or 3) the last sub-frame and the first sub-frame being the target sub-frame and the adjustment symbol being a last OFDM symbol of the last sub-frame and a first OFDM symbol of the first sub-frame.

The different combinations of the first information and the second information correspond to different symbol setting strategies, which may be understood that any one of the above three situations may be selected for one of the different combinations of the first information and the second information. It may be pre-defined in the protocol which situation is selected for a certain combination of the first and second information. When the base station determines the data types of the information carried in the two sub-frames before and after performing the frequency adjustment or the uplink/downlink switching, the sub-frame which may be selected as the target sub-frame and the OFDM symbol in the target sub-frame that may be determined as the adjustment symbol can be determined based on the above first symbol setting strategy. For example, Table 3 shows several combinations of the first and second information, and the position of the adjustment symbol corresponding to each combination.

TABLE 3

| information carried in the last sub-frame before performing the frequency adjustment or the uplink/downlink switching | information carried in the first sub-frame after performing the frequency adjustment or the uplink/downlink switching | OFDM symbol in the last sub-frame before performing the frequency adjustment or the uplink/downlink switching that may be used as the adjustment symbol | OFDM symbol in the first sub-frame after performing the frequency adjustment or the uplink/downlink switching that may be used as the adjustment symbol |
|---|---|---|---|
| MPDCCH message | MPDCCH message | $14^{th}$ | $1^{st}$ |
| MPDSCH message | MPDSCH message | $14^{th}$ | $1^{st}$ |
| MPUCCH message | MPDCCH message | none | $1^{st}, 2^{nd}$ |
| MPUSCH message | MPDSCH message | none | $1^{st}, 2^{nd}$ |

The $1^{st}$ in the above table 3 represents the first OFDM symbol in the first sub-frame after performing the frequency adjustment or the uplink/downlink switching, and the $14^{th}$ represents the last OFDM symbol in the last sub-frame before performing the frequency adjustment or the uplink/downlink switching (see FIG. 2c which shows the positions of the adjustment symbols); the $1^{st}$ and $2^{nd}$ represent the first two OFDM symbols in the first sub-frame after performing the frequency adjustment or the uplink/downlink switching (see FIG. 2b which shows the positions of the adjustment symbols). As shown in Table 3, OFDM symbols at different positions are determined as the adjustment symbols for different combinations of the information carried in the two sub-frames before and after performing the frequency adjustment or the uplink/downlink switching. In addition, the several cases shown in Table 3 merely present a part of combinations of the first information and the second information, and the other combinations will not be listed here. The positions of the adjustment symbols shown in Table 3 are exemplary, and the present disclosure is not limited to this. For example, Table 3 may also be modified to the symbol setting strategy shown in Table 4.

TABLE 4

| information carried in the last sub-frame before performing the frequency adjustment or the uplink/downlink switching | information carried in the first sub-frame after performing the frequency adjustment or the uplink/downlink switching | OFDM symbol in the last sub-frame before performing the frequency adjustment or the uplink/downlink switching that may be used as the adjustment symbol | OFDM symbol in the first sub-frame after performing the frequency adjustment or the uplink/downlink switching that may be used as the adjustment symbol |
|---|---|---|---|
| MPDCCH message | MPDCCH message | $14^{th}$ | $1^{st}$ |
| MPDSCH message | MPDSCH message | $14^{th}$ | $1^{st}$ |
| MPUCCH message | MPDCCH message | none | $1^{st}, 2^{nd}$ |
| MPUSCH message | MPDSCH message | $13^{th}, 14^{th}$ | none |

Figure 4:
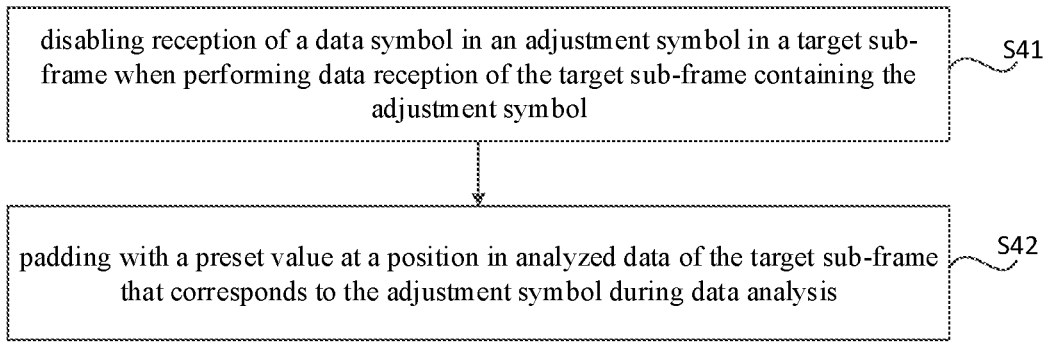
FIG. 4 is a flow chart illustrating a data transmission method according to a further example embodiment.

FIG. 4 is a flow chart illustrating a data transmission method according to another example embodiment. The method is applied to a user device. As shown in FIG. 4, the method may include the followings.

At block S41, reception of a data symbol corresponding to an adjustment symbol in a target sub-frame is disabled when performing data reception of the target sub-frame containing the adjustment symbol.

The target sub-frame is a last sub-frame before performing a frequency adjustment or an uplink/downlink switching, and/or a first sub-frame after performing the frequency adjustment or the uplink/downlink switching, and the adjustment symbol is an OFDM symbol used for an adjustment time of a narrowband frequency adjustment or an adjustment time of the uplink/downlink switching. A fundamental for selecting the target sub-frame and the adjustment symbol may be set according to the requirement, and be pre-defined in a protocol, so that both the base station and the user device may clearly know which sub-frame is the target sub-frame containing the adjustment symbol and the location of the adjustment symbol in a process of resource mapping, data transmission and data reception of users. Therefore, when the user device receives the target sub-frame, it may know which OFDM symbol in the target sub-frame is the adjustment symbol (or which two OFDM symbols in the target sub-frame are the adjustment symbols), and disable reception of the data transmission corresponding to the adjustment symbol.

At block S42, a preset value is used to be padded at a position in analyzed data of the target sub-frame that corresponds to the adjustment symbol during data analysis.

Since the data of the adjustment symbol is dropped when receiving data, the analyzed data is incomplete and needs to be padded. For example, the preset value may be 0 or 1, and accordingly, the block S42 may include during the data analysis, 0 or 1 may be padded at the position corresponding to the adjustment symbol in the analyzed data of the target sub-frame.

That is, the missing data of the target sub-frame may be padded with 1 or 0 by bits at the positions corresponding to the adjustment symbol. For example, assuming that 10 data symbols may be transmitted on one OFDM symbol, 140 data symbols may be transmitted on one sub-frame that includes 14 OFDM symbols. Assuming that the last sub-frame before performing the frequency adjustment or the uplink/downlink switching is configured as the target sub-frame containing the adjustment symbols and the adjustment symbols are the last two OFDM symbols in the last sub-frame (see the structure shown in FIG. 2*a*), the data symbols in the last two OFDM symbols will be dropped when the user device transmits data and thus the obtained data of the sub-frame includes 120 data symbols. In this case, as the complete data should have 140 data symbols, data at the positions corresponding to the 121st to 140th data symbols is missing. 0 or 1 may be padded at the positions corresponding to the last two OFDM symbols in order to ensure integrity of the data. That is, 0 or 1 may be used to be padded at the positions corresponding to the 121st to 140th data symbols. Whether 0 or 1 is used to be padded may be set as requirement.

The above technical solutions provide a scheme of setting an adjustment time of a narrowband frequency adjustment or an adjustment time of an uplink/downlink switching for the independently deployed MTC system and a data transmission method for such scheme, which may solve the problem that the adjustment time of the narrowband frequency adjustment or the adjustment time of the uplink/downlink switching cannot be configured when a control channel region is occupied by the MPDCCH and MPDSCH in the independently deployed MTC system.

A method for configuring the target sub-frame and the adjustment symbol will be described below. In a first implementation, it may be pre-defined in the protocol which sub-frame is selected as the target sub-frame and which OFDM symbol in this target sub-frame is determined as the adjustment symbol. There are may be three situations as follows: 1) the last sub-frame before performing the frequency adjustment or the uplink/downlink switching is selected as the target sub-frame, and the adjustment symbol is configured as last two OFDM symbols of the last sub-frame (see FIG. 2*a*); 2) the first sub-frame after performing the frequency adjustment or the uplink/downlink switching is selected as the target sub-frame, and the adjustment symbol is configured as first two OFDM symbols of the first sub-frame (see FIG. 2*b*); or 3) both the last sub-frame before performing the frequency adjustment or the uplink/downlink switching and the first sub-frame after performing the frequency adjustment or uplink/downlink switching are selected as the target sub-frame, and the adjustment symbol is configured as a last OFDM symbol of the last sub-frame and a first OFDM symbol of the first sub-frame (see FIG. 2*c*).

Figure 5:
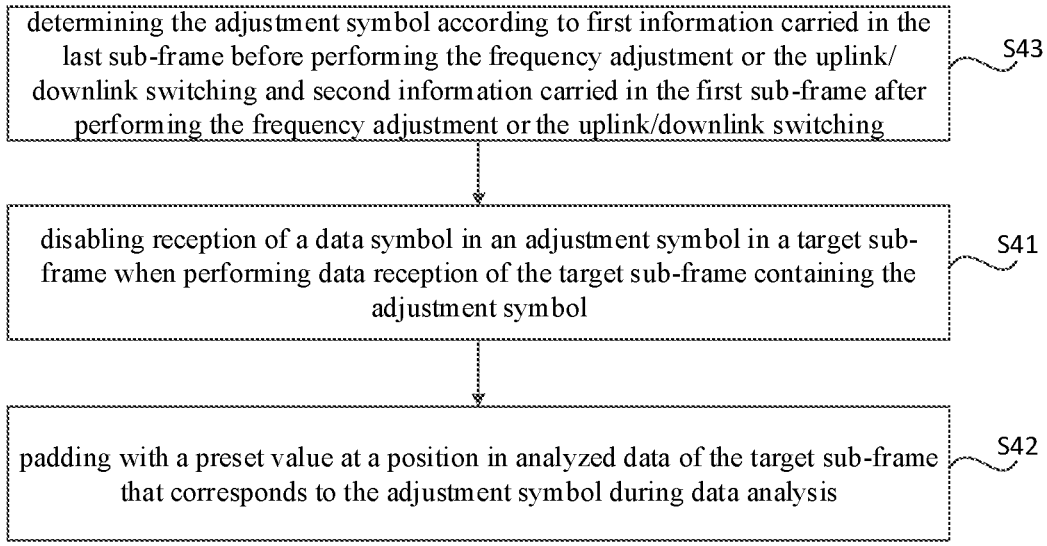
FIG. 5 is a flow chart illustrating a data transmission method according to a still example embodiment.

In a second implementation, it is possible to determine which sub-frame is selected as the target sub-frame and to determine which OFDM symbol in the target sub-frame is used as the adjustment symbol according to information carried in the two sub-frames before and after performing the frequency adjustment or the uplink/downlink switching. FIG. 5 is a flow chart illustrating a data transmission method according to a still example embodiment. The method is applied to a user device. As shown in FIG. 5, the data transmission method may further include the followings.

At block S43, the adjustment symbol is determined according to first information carried in the last sub-frame before performing the frequency adjustment or the uplink/downlink switching and second information carried in the first sub-frame after performing the frequency adjustment or the uplink/downlink switching.

The user device may select the same or different schemes according to whether the first information carried in the last sub-frame before performing the frequency adjustment or the uplink/downlink switching is the same as or different from the second information carried in the first sub-frame after performing the frequency adjustment or the uplink/downlink switching. The information that may be carried in the sub-frames before and after performing the frequency adjustment or the uplink/downlink switching may include: MPDCCH, MPUCCH, MPDSCH or MPUSCH. The MPDCCH and MPUCCH are usually used to transmit control information, and the MPDSCH and MPUSCH are usually used to transmit data information.

It should be noted that before performing the frequency adjustment or the uplink/downlink switching, the user device may know a time point of performing the frequency adjustment or the uplink/downlink switching and the information carried in the sub-frames before and after performing the frequency adjustment or the uplink/downlink switching based on received scheduling information.

Therefore, in a first implementation in which information types of the first information and the second information are different, the OFDM symbol carrying data information may be used as much as possible and thus the sub-frame carrying data information is selected. The block S43 may include determining the last sub-frame as the target sub-frame and last two OFDM symbols of the last sub-frame as the adjustment symbol when the first information is data information and the second information is control information, or determining the first sub-frame as the target sub-frame and first two OFDM symbols of the first sub-frame as the adjustment symbol when the first information is control information and the second information is data information.

The first and second information may be any of the MPDCCH, MPUCCH, MPDSCH and MPUSCH. If the first or second information is the MPDCCH or MPUCCH, the first or second information is the control information. If the first or second information is the MPDSCH or MPUSCH, the first or second information is the data information. For example, Table 1 and descriptions of Table 1 may be referenced, which will not be repeated here.

The symbol setting strategy described above may be pre-defined in the protocol. When the user device determines the data types of the information carried in the two sub-frames before and after performing the frequency adjustment or the uplink/downlink switching, which sub-frame may be selected as the target sub-frame and which OFDM symbol in the target sub-frame may be used as the adjustment symbol can be determined based on the above symbol setting strategy.

In a second implementation in which information types of the first information and the second information are identical, that is, both the information carried in the two sub-frames before and after the frequency adjustment or the uplink/downlink switching is data information, or both the information carried in the two sub-frames before and after the frequency adjustment or the uplink/downlink switching is control information. The block S43 may include any of the following three situations: 1) determining the last sub-frame as the target sub-frame and last two OFDM symbols of the last sub-frame as the adjustment symbol; 2) determining the first sub-frame as the target sub-frame and first two OFDM symbols of the first sub-frame as the adjustment symbol; or 3) determining the last sub-frame and the first sub-frame as the target sub-frame and a last OFDM symbol of the last sub-frame and a first OFDM symbol of the first sub-frame as the adjustment symbol.

The above three situations may refer to those shown in FIG. 2a to FIG. 2b, it may be pre-defined in the protocol which situation is adopted. That is, it is specified in the protocol: in case that both the information carried in the two sub-frames before and after performing the frequency adjustment or the uplink/downlink switching or both the information carried in the two sub-frames before and after performing the frequency adjustment or the uplink/downlink switching is control information which sub-frame is selected as the target sub-frame and which OFDM symbol in the target sub-frame is determined as the adjustment symbol. In this way, the user device may determine the target sub-frame and the OFDM symbol in this target sub-frame that may be used as the adjustment symbol in case that both the information carried in the two sub-frames before and after performing the frequency adjustment or the uplink/downlink switching are data information, or both the information carried in the two sub-frames before and after performing the frequency adjustment or the uplink/downlink switching are control information.

In a third implementation in which the same OFDM symbol positions may be selected for all combinations of the information carried in two sub-frames before and after performing the frequency adjustment or the uplink/downlink switching.

Accordingly, the block S43 may include determining the adjustment symbol based on a first symbol setting strategy corresponding to the first information and the second information; in which the first symbol setting strategy is preset, and all combinations of the first information and the second information correspond to the first symbol setting strategy.

The first symbol setting strategy includes one of the following three situations: 1) the last sub-frame being the target sub-frame and the adjustment symbol being last two OFDM symbols of the last sub-frame; 2) the first sub-frame being the target sub-frame and the adjustment symbol being the first two OFDM symbols of the first sub-frame; or 3) the last sub-frame and the first sub-frame being the target sub-frame and the adjustment symbol being a last OFDM symbol of the last sub-frame and a first OFDM symbol of the first sub-frame.

It may be pre-defined in the protocol which of the above three situations is adopted for the first symbol setting strategy. When the user device determines the data types of the information carried in the two sub-frames before and after performing the frequency adjustment or the uplink/downlink switching, which sub-frame may be selected as the target sub-frame and which OFDM symbol in this target sub-frame may be determined as the adjustment symbol can be determined based on the above first symbol setting strategy. For example, Table 2 and descriptions of Table 2 may be referenced, which will not be repeated here.

In a fourth implementation in which different OFDM symbol positions may be selected for different combinations of the information carried in the two sub-frames before and after performing the frequency adjustment or the uplink/downlink switching.

Accordingly, the block S43 may include determining the adjustment symbol based on a first symbol setting strategy corresponding to the first information and the second information. The first symbol setting strategy is preset, different combinations of the first information and the second information correspond to different symbol setting strategies respectively, and the first symbol setting strategy is any one of the different symbol setting strategies.

The first symbol setting strategy includes one of the following three situations: 1) the last sub-frame being the target sub-frame and the adjustment symbol being last two OFDM symbols of the last sub-frame; 2) the first sub-frame being the target sub-frame and the adjustment symbol being the first two OFDM symbols of the first sub-frame; or 3) the last sub-frame and the first sub-frame being the target sub-frame and the adjustment symbol being a last OFDM symbol of the last sub-frame and a first OFDM symbol of the first sub-frame.

The different combinations of the first information and the second information correspond to different symbol setting strategies, which may be understood that any one of the above three situations may be adopted for one of the different combinations of the first information and the second information. It may be pre-defined in the protocol which situation is selected for a certain combination of the first and second information. When the user device determines the data types of the information carried in the two sub-frames before and after performing the frequency adjustment or the uplink/downlink switching, which sub-frame may be selected as the target sub-frame and which OFDM symbol in the target sub-frame may be used as the adjustment symbol can be determined based on the above first symbol setting strategy. For example, Table 3, Table 4 and the descriptions thereof may be referenced.

In the above technical solution, data symbols are mapped to a data transmission symbol and an adjustment symbol of a target sub-frame when the base station performs resource mapping on a physical downlink channel for the target sub-frame containing the adjustment symbol, and the data symbol corresponding to the adjustment symbol is transmitted or dropped when performing data transmission in the target sub-frame. The target sub-frame is a last sub-frame before performing a frequency adjustment or an uplink/downlink switching, and/or a first sub-frame after performing the frequency adjustment or the uplink/downlink switching, the data transmission symbol is an OFDM symbol for transmitting data, and the adjustment symbol is an OFDM symbol used for an adjustment time of a narrowband frequency adjustment or an adjustment time of the uplink/downlink switching. Accordingly, reception of a data symbol corresponding to an adjustment symbol in a target sub-frame is disabled when the user device performs data reception of the target sub-frame containing the adjustment symbol and a preset value is used to padded at a position in analyzed data of the target sub-frame that corresponds to the adjustment symbol during data analysis. The present disclosure provides a scheme to configure the adjustment time of the narrowband frequency adjustment or the adjustment time of the uplink/downlink switching for the independently deployed MTC system, which may solve the problem that the adjustment time of the narrowband frequency adjustment or the adjustment time of the uplink/downlink switching cannot be configured when a control channel region is occupied by the MPDCCH and MPDSCH in the independently deployed MTC system.

Figure 6:
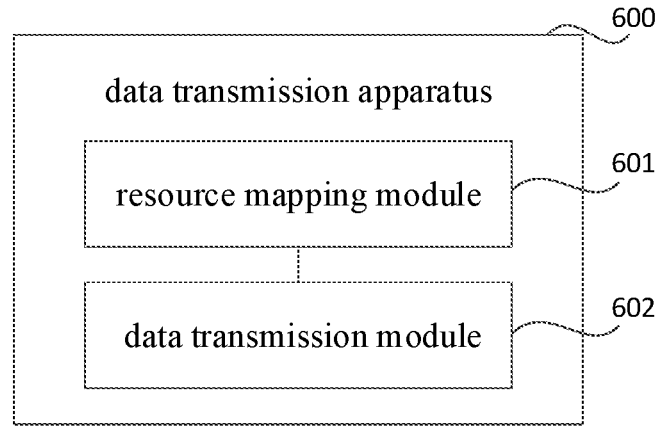
FIG. 6 is a block diagram illustrating a data transmission apparatus according to an example embodiment.

FIG. 6 is a block diagram illustrating a data transmission apparatus according to an example embodiment. The apparatus is applied to a base station. As shown in FIG. 6, the apparatus 600 may include a resource mapping module 601 and a data transmission module 602. Of course, it should be understood that one or more of the modules described in this disclosure can be implemented by hardware, for example, circuitry.

The resource mapping module 601 is configured to map data symbols to a data transmission symbol and an adjustment symbol of a target sub-frame containing the adjustment symbol in response to performing resource mapping on a physical downlink channel. The target sub-frame is a last sub-frame before performing a frequency adjustment or an uplink/downlink switching and/or a first sub-frame after performing the frequency adjustment or the uplink/downlink switching, the data transmission symbol is an OFDM symbol for transmitting data, and the adjustment symbol is an OFDM symbol used for an adjustment time of a narrowband frequency adjustment or an adjustment time of the uplink/downlink switching.

The data transmission module 602 is configured to transmit the data symbol in the adjustment symbol or disable transmission of the data symbol in the adjustment symbol when performing data transmission in the target sub-frame.

Alternatively, the last sub-frame before performing the frequency adjustment or the uplink/downlink switching is configured as the target sub-frame, and the adjustment symbol is configured as last two OFDM symbols of the last sub-frame; or, the first sub-frame after performing the frequency adjustment or the uplink/downlink switching is configured as the target sub-frame, and the adjustment symbol is configured as first two OFDM symbols of the first sub-frame; or, both the last sub-frame before performing the frequency adjustment or the uplink/downlink switching and the first sub-frame after performing the frequency adjustment or the uplink/downlink switching are configured as the target sub-frame, and the adjustment symbol is configured as a last OFDM symbol of the last sub-frame and a first OFDM symbol of the first sub-frame.

Figure 7:
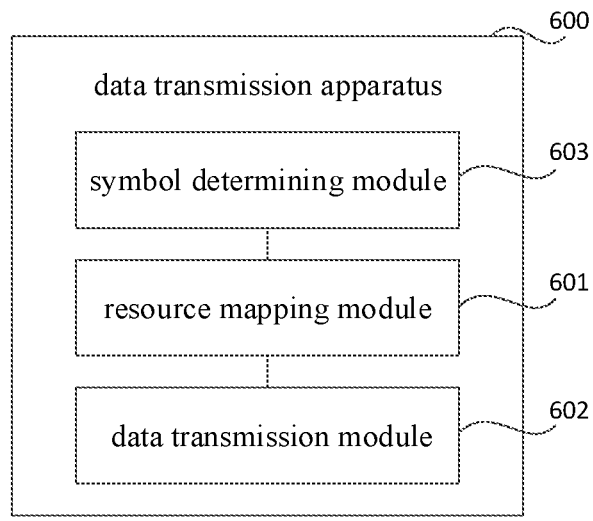
FIG. 7 is a block diagram illustrating a data transmission apparatus according to another example embodiment.

Alternatively, FIG. 7 is a block diagram illustrating a data transmission apparatus according to another example embodiment. The apparatus is applied to a base station. As shown in FIG. 7, the apparatus 600 may further include: a symbol determining module 603.

The symbol determining module 603 is configured to determine the adjustment symbol according to first information carried in the last sub-frame before performing the frequency adjustment or the uplink/downlink switching and second information carried in the first sub-frame after performing the frequency adjustment or the uplink/downlink switching.

Alternatively, when information types of the first information and the second information are different, the symbol determining module 603 is configured to: determine the last sub-frame as the target sub-frame and last two OFDM symbols of the last sub-frame as the adjustment symbol when the first information is data information and the second information is control information; or determine the first sub-frame as the target sub-frame and first two OFDM symbols of the first sub-frame as the adjustment symbol when the first information is control information and the second information is data information.

Further, when information types of the first information and the second information are identical, the symbol determining module 603 is configured to: determine the last sub-frame as the target sub-frame and last two OFDM symbols of the last sub-frame as the adjustment symbol; or determine the first sub-frame as the target sub-frame and first two OFDM symbols of the first sub-frame as the adjustment symbol; or determine the last sub-frame and the first sub-frame as the target sub-frame and a last OFDM symbol of the last sub-frame and a first OFDM symbol of the first sub-frame as the adjustment symbol.

Alternatively, the symbol determining module 603 is configured to determine the adjustment symbol based on a first symbol setting strategy corresponding to the first information and the second information. The first symbol setting strategy is preset, and all combinations of the first information and the second information correspond to the first symbol setting strategy.

The first symbol setting strategy includes the last sub-frame being the target sub-frame and the adjustment symbol being last two OFDM symbols of the last sub-frame, the first sub-frame being the target sub-frame and the adjustment symbol being first two OFDM symbols of the first sub-frame, or the last sub-frame and the first sub-frame being the target sub-frame and the adjustment symbol being a last OFDM symbol of the last sub-frame and a first OFDM symbol of the first sub-frame.

Alternatively, the symbol determining module 603 is configured to determine the adjustment symbol based on a first symbol setting strategy corresponding to the first information and the second information. The first symbol setting strategy is preset, different combinations of the first information and the second information correspond to different symbol setting strategies respectively, and the first symbol setting strategy is any one of the different symbol setting strategies.

The first symbol setting strategy includes the last sub-frame being the target sub-frame and the adjustment symbol being last two OFDM symbols of the last sub-frame, the first sub-frame being the target sub-frame and the adjustment symbol being first two OFDM symbols of the first sub-frame, or the last sub-frame and the first sub-frame being the target sub-frame and the adjustment symbol being a last OFDM symbol of the last sub-frame and a first OFDM symbol of the first sub-frame.

Figure 8:
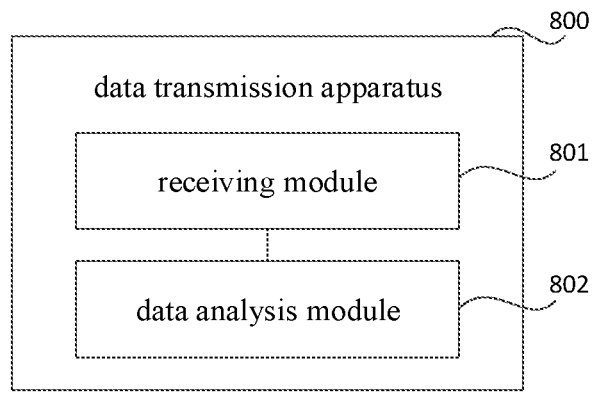
FIG. 8 is a block diagram illustrating a data transmission apparatus according to a further example embodiment.

FIG. 8 is a block diagram illustrating a data transmission apparatus according to a further example embodiment. The apparatus is applied to a user device. As shown in FIG. 8, the apparatus 800 may include: a receiving module 801 and a data analysis module 802.

The receiving module 801 is configured to disable reception of a data symbol in an adjustment symbol in a target sub-frame when performing data reception of the target sub-frame containing the adjustment symbol. The target sub-frame is a last sub-frame before performing a frequency adjustment or an uplink/downlink switching and/or a first sub-frame after performing the frequency adjustment or the uplink/downlink switching, and the adjustment symbol is an OFDM symbol used for an adjustment time for of a narrowband frequency adjustment or an adjustment time for of the uplink/downlink switching.

The data analysis module 802 is configured to pad with a preset value at a position in analyzed data of the target sub-frame that corresponds to the adjustment symbol during data analysis.

Alternatively, the last sub-frame before performing the frequency adjustment or the uplink/downlink switching is configured as the target sub-frame, and the adjustment symbol is configured as last two OFDM symbols of the last sub-frame; or the target sub-frame is the first sub-frame after performing the frequency adjustment or the uplink/downlink switching is configured as the target sub-frame, and the adjustment symbol is configured as first two OFDM symbols of the first sub-frame; or both the last sub-frame before performing the frequency adjustment or the uplink/downlink switching and the first sub-frame after performing the frequency adjustment or the uplink/downlink switching are configured as the target sub-frame, and the adjustment symbol is configured as a last OFDM symbol of the last sub-frame and a first OFDM symbol of the first sub-frame.

Figure 9:
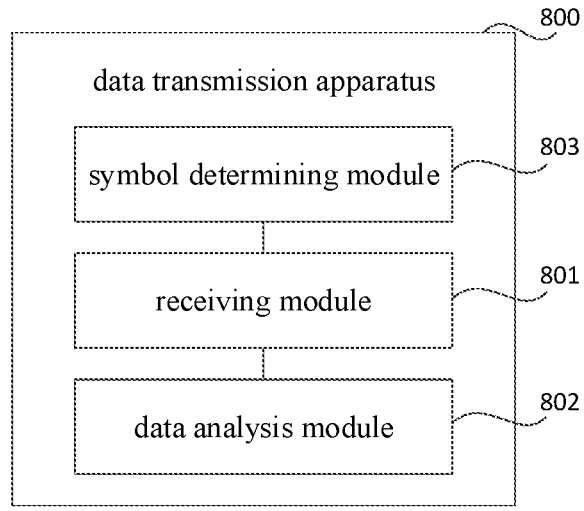
FIG. 9 is a block diagram illustrating a data transmission apparatus according to a still example embodiment.

Alternatively, FIG. 9 is a block diagram illustrating a data transmission apparatus according to a still example embodiment. The apparatus is applied to a user device. As shown in FIG. 8, the apparatus 800 may further include a symbol determining module 803.

The symbol determining module 803 is configured to determine the adjustment symbol according to first information carried in the last sub-frame before performing the frequency adjustment or the uplink/downlink switching and second information carried in the first sub-frame after performing the frequency adjustment or the uplink/downlink switching.

Alternatively, when information types of the first information and the second information are different, the symbol determining module 803 is configured to determine the last sub-frame as the target sub-frame and last two OFDM symbols of the last sub-frame as the adjustment symbol when the first information is data information and the second information is control information, or determine the first sub-frame as the target sub-frame and first two OFDM symbols of the first sub-frame as the adjustment symbol when the first information is control information and the second information is data information.

Additionally, when information types of the first information and the second information are identical, the symbol determining module 803 is configured to: determine the last sub-frame as the target sub-frame and last two OFDM symbols of the last sub-frame as the adjustment symbol, determine the first sub-frame as the target sub-frame and first two OFDM symbols of the first sub-frame as the adjustment symbol, or determine the last sub-frame and the first sub-frame as the target sub-frame and a last OFDM symbol of the last sub-frame and a first OFDM symbol of the first sub-frame as the adjustment symbol.

Alternatively, the symbol determining module 803 is configured to determine the adjustment symbol based on a first symbol setting strategy corresponding to the first information and the second information. The first symbol setting strategy is preset, and all combinations of the first information and the second information correspond to the first symbol setting strategy.

The first symbol setting strategy includes the last sub-frame being the target sub-frame and the adjustment symbol being last two OFDM symbols of the last sub-frame, the first sub-frame being the target sub-frame and the adjustment symbol being first two OFDM symbols of the first sub-frame, or the last sub-frame and the first sub-frame being the target sub-frame and the adjustment symbol being a last OFDM symbol of the last sub-frame and a first OFDM symbol of the first sub-frame.

Alternatively, the symbol determining module 803 is configured to determine the adjustment symbol based on a first symbol setting strategy corresponding to the first information and the second information. The first symbol setting strategy is preset, different combinations of the first information and the second information correspond to different symbol setting strategies respectively, and the first symbol setting strategy is any one of the different symbol setting strategies.

The first symbol setting strategy includes: the last sub-frame being the target sub-frame and the adjustment symbol being last two OFDM symbols of the last sub-frame, the first sub-frame being the target sub-frame and the adjustment symbol being first two OFDM symbols of the first sub-frame, or the last sub-frame and the first sub-frame being the target sub-frame and the adjustment symbol being a last OFDM symbol of the last sub-frame and a first OFDM symbol of the first sub-frame.

Alternatively, the data analysis module 802 is configured to pad with zero or one at the position in the analyzed data of the target sub-frame that corresponds to the adjustment symbol during the data analysis.

In the above technical solution, data symbols are mapped to a data transmission symbol and an adjustment symbol of a target sub-frame when the base station performs resource mapping on a physical downlink channel for the target sub-frame containing the adjustment symbol, and the data symbol corresponding to the adjustment symbol is transmitted or transmission of the data symbol corresponding to the adjustment symbol is disabled when performing data transmission in the target sub-frame. The target sub-frame is a last sub-frame before performing a frequency adjustment or an uplink/downlink switching and/or a first sub-frame after performing the frequency adjustment or the uplink/downlink switching, the data transmission symbol is an OFDM symbol for transmitting data, and the adjustment symbol is an OFDM symbol used for an adjustment time of a narrowband frequency adjustment or an adjustment time of the uplink/downlink switching. Accordingly, reception of a data symbol corresponding to an adjustment symbol in a target sub-frame is disabled when the user device performs data reception of the target sub-frame containing the adjustment symbol and a preset value is used to padded at a position in analyzed data of the target sub-frame that corresponds to the adjustment symbol during data analysis. The present disclosure provides a scheme to configure the adjustment time of the narrowband frequency adjustment or the adjustment time of the uplink/downlink switching for the independently deployed MTC system and a data transmission method for such scheme, which may solve the problem that the adjustment time of the narrowband frequency adjustment or the adjustment time of the uplink/downlink switching cannot be configured when a control channel region is occupied by the MPDCCH and MPDSCH in the independently deployed MTC system.

Figure 10:
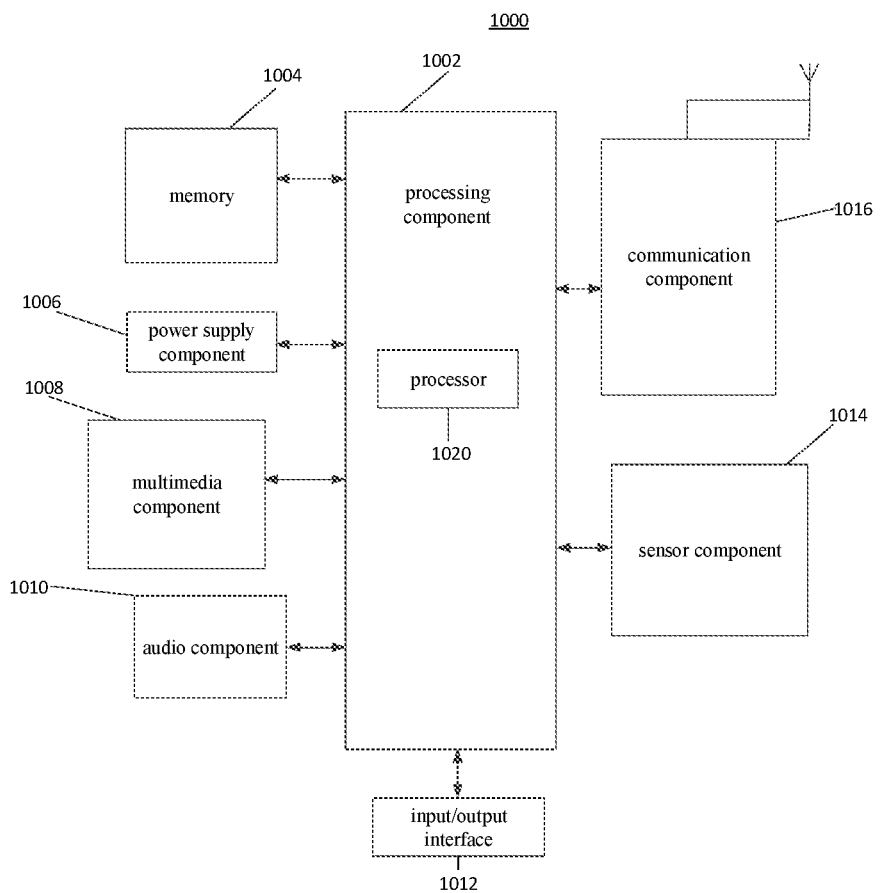
FIG. 10 is a block diagram illustrating a data transmission device according to yet another example embodiment.

FIG. 10 is a block diagram illustrating a data transmission device according to yet another example embodiment. For example, the device 1000 may be a user device, such as a mobile phone, a computer, a digital broadcasting terminal, a messaging device, a game console, a tablet device, a medical device, a fitness device, a personal digital assistant, and so on.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls the overall operations of the device 1000, such as operations associated with display, telephone calls, data communications, camera operations, and recording operations. The processing component 1002 may include one or more processors 1020 to execute instructions to complete all or part of the steps of the aforementioned data transmission method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support operations in the device 1000. Examples of these data include instructions for any application or method operating on the device 1000, contact data, phone book data, messages, pictures, videos, etc. The memory 1004 may be implemented by any type of volatile or non-volatile storage device or their combination, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power component 1006 provides power to various components of the device 1000. The power component 1006 may include a power management system, one or more power supplies, and other components associated with generating, managing, and distributing power to the device 1000.

The multimedia component 1008 includes a screen that provides an output interface between the device 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of the touch or slide action, but also detect the duration and pressure related to the touch or slide operation. In some embodiments, the multimedia component 1008 includes a front camera and/or a rear camera. When the device 1000 is in an operation mode, such as a shooting mode or a video mode, the front camera and/or the rear camera can receive external multimedia data. Each front camera and rear camera may be a fixed optical lens system or have focal length and optical zooming capabilities.

The audio component 1010 is configured to output and/or input audio signals. For example, the audio component 1010 includes a microphone (MIC), and when the device 1000 is in an operation mode, such as a call mode, a recording mode, and a voice recognition mode, the microphone is configured to receive external audio signals. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The peripheral interface module may be a keyboard, a click wheel, a button, and the like. These buttons may include, but are not limited to: a home button, a volume button, a start button, and a lock button.

The sensor component 1014 includes one or more sensors for providing the device 1000 with various aspects of state evaluation. For example, the sensor component 1014 may detect the opening/closing state of the device 1000 and the relative positioning of the components. For example, the component is the display and the keypad of the device 1000. The sensor component 1014 may also detect the position changes of the device 1000 or a component of the device 1000, a presence or absence of contacts between the user and the device 1000, an orientation or an acceleration/deceleration of the device 1000, and temperature changes of the device 1000. The sensor assembly 1014 may include a proximity sensor configured to detect the presence of nearby objects when there is no physical contact. The sensor component 1014 may also include a light sensor, such as a CMOS or CCD image sensor, for use in imaging applications. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and other devices. The device 1000 may access a wireless network based on any communication standard, such as Wi-Fi, 2G, or 3G, or a combination thereof. In an example embodiment, the communication component 1016 receives a broadcast signal or broadcast related information from an external broadcast management system via a broadcast channel. In an example embodiment, the communication component 1016 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example embodiment, the device 1000 may be implemented by one or more application specific integrated circuits (ASIC), digital signal processors (DSP), digital signal processing devices (DSPD), programmable logic devices (PLD), a field programmable gate array (FPGA), controllers, microcontrollers, microprocessors, or other electronic components, used to implement the above-mentioned data transmission method.

In an example embodiment, there is also provided a non-transitory computer-readable storage medium including instructions, such as the memory 1004 including instructions, which may be executed by the processor 1020 of the device 1000 to complete the above data transmission method. For example, the non-transitory computer-readable storage medium may be a ROM, a random access memory (RAM), a CD-ROM, a magnetic tape, a floppy disk, an optical data storage device, and the like.

Figure 11:
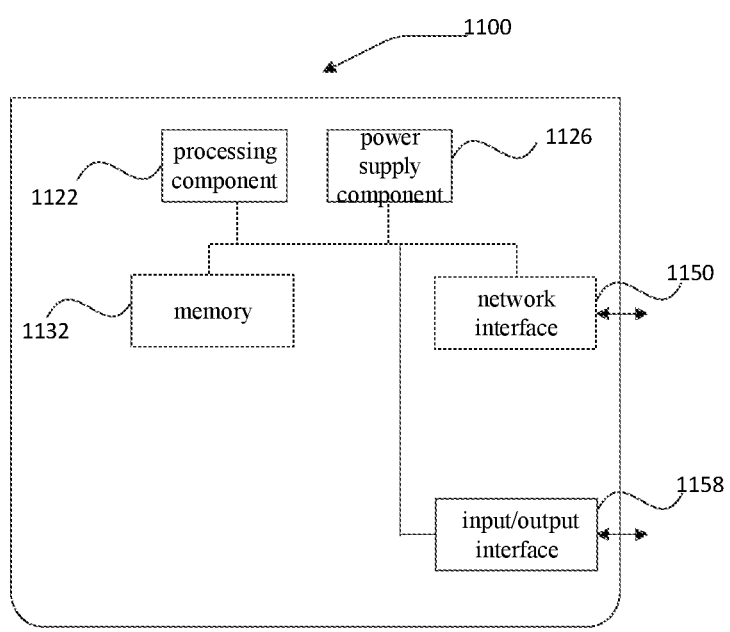
FIG. 11 is a block diagram illustrating a data transmission device according to still another example embodiment.

FIG. 11 is a block diagram illustrating a data transmission device according to another example embodiment. For example, the device 1100 may be provided as a server or a base station. Referring to FIG. 11, the device 1100 includes a processing component 1122, which further includes one or more processors, and a memory resource represented by a memory 1132, for storing instructions that may be executed by the processing component 1122, such as an application program. The application program stored in the memory 1132 may include one or more modules each corresponding to a set of instructions. In addition, the processing component 1122 is configured to execute instructions to execute the aforementioned data transmission method.

The device 1100 may also include a power supply component 1126 configured to perform power management of the device 1100, a wired or wireless network interface 1150 configured to connect the device 1100 to a network, and an input output (I/O) interface 1158. The device 1100 may operate based on an operating system stored in the memory 1132, such as a Windows Server™, a Mac OS X™, a Unix™, a Linux™, a FreeBSD™ or the like.

This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A data transmission method that is applicable to a base station, the method comprising:
   determining an adjustment symbol based on first information carried in a last sub-frame before performing a frequency adjustment or an uplink/downlink switching and second information carried in a first sub-frame after performing the frequency adjustment or the uplink/downlink switching;
   mapping data symbols to a data transmission symbol and the adjustment symbol of a target sub-frame containing the adjustment symbol in response to performing resource mapping on a physical downlink channel, wherein:
      the target sub-frame is the last sub-frame before performing the frequency adjustment or the uplink/downlink switching and/or the first sub-frame after performing the frequency adjustment or the uplink/downlink switching,
      the data transmission symbol is an orthogonal frequency division multiplexing (OFDM) symbol for transmitting data, and
      the adjustment symbol is an OFDM symbol used for an adjustment time of a narrowband frequency adjustment or an adjustment time of the uplink/downlink switching; and
   transmitting the data symbol in the adjustment symbol or disabling transmission of the data symbol in the adjustment symbol in response to performing data transmission in the target sub-frame.

2. The method of claim 1, wherein:
   the last sub-frame before performing the frequency adjustment or the uplink/downlink switching is configured as the target sub-frame, and the adjustment symbol is configured as a last two OFDM symbols of the last sub-frame;
   the first sub-frame after performing the frequency adjustment or the uplink/downlink switching is configured as the target sub-frame, and the adjustment symbol is configured as a first two OFDM symbols of the first sub-frame; or
   both the last sub-frame before performing the frequency adjustment or the uplink/downlink switching and the first sub-frame after performing the frequency adjustment or the uplink/downlink switching are configured as the target sub-frame, and the adjustment symbol is configured as a last OFDM symbol of the last sub-frame and a first OFDM symbol of the first sub-frame.

3. The method of claim 1, wherein, in response to information types of the first information and the second information being different, determining the adjustment symbol according to the first information carried in the last sub-frame before performing the frequency adjustment or the uplink/downlink switching and the second information carried in the first sub-frame after performing the frequency adjustment or the uplink/downlink switching comprises:
   determining the last sub-frame as the target sub-frame and the last two OFDM symbols of the last sub-frame as the adjustment symbol in response to the first information being data information and the second information being control information; or
   determining the first sub-frame as the target sub-frame and the first two OFDM symbols of the first sub-frame as the adjustment symbol in response to the first information being control information and the second information being data information.

4. The method of claim 1, wherein, in response to information types of the first information and the second information being identical, determining the adjustment symbol according to the first information carried in the last sub-frame before performing the frequency adjustment or the uplink/downlink switching and the second information carried in the first sub-frame after performing the frequency adjustment or the uplink/downlink switching comprises:
   determining the last sub-frame as the target sub-frame and the last two OFDM symbols of the last sub-frame as the adjustment symbol; or
   determining the first sub-frame as the target sub-frame and the first two OFDM symbols of the first sub-frame as the adjustment symbol; or
   determining the last sub-frame and the first sub-frame as the target sub-frame and a last OFDM symbol of the last sub-frame and a first OFDM symbol of the first sub-frame as the adjustment symbol.

5. The method of claim 1, wherein determining the adjustment symbol according to the first information carried in the last sub-frame before performing the frequency adjustment or the uplink/downlink switching and the second information carried in the first sub-frame after performing the frequency adjustment or the uplink/downlink switching comprises:

determining the adjustment symbol based on a first symbol setting strategy corresponding to the first information and the second information, where the first symbol setting strategy is preset, and all combinations of the first information and the second information correspond to the first symbol setting strategy;

wherein the first symbol setting strategy includes:

the last sub-frame being the target sub-frame and the adjustment symbol being the last two OFDM symbols of the last sub-frame;

the first sub-frame being the target sub-frame and the adjustment symbol being the first two OFDM symbols of the first sub-frame; or the last sub-frame and the first sub-frame being the target sub-frame and the adjustment symbol being a last OFDM symbol of the last sub-frame and a first OFDM symbol of the first sub-frame.

6. The method of claim 1, wherein determining the adjustment symbol according to the first information carried in the last sub-frame before performing the frequency adjustment or the uplink/downlink switching and the second information carried in the first sub-frame after performing the frequency adjustment or the uplink/downlink switching further comprises:

determining the adjustment symbol based on a first symbol setting strategy corresponding to the first information and the second information, where the first symbol setting strategy is preset, different combinations of the first information and the second information correspond to different symbol setting strategies respectively, and the first symbol setting strategy is any one of the different symbol setting strategies;

wherein the first symbol setting strategy includes:

the last sub-frame being the target sub-frame and the adjustment symbol being the last two OFDM symbols of the last sub-frame;

the first sub-frame being the target sub-frame and the adjustment symbol being the first two OFDM symbols of the first sub-frame; or the last sub-frame and the first sub-frame being the target sub-frame and the adjustment symbol being a last OFDM symbol of the last sub-frame and a first OFDM symbol of the first sub-frame.

7. A data transmission device that is applicable to a base station, comprising:

a processor; and a memory that is configured to store instructions executable by the processor, wherein the processor is configured to perform the method according to claim 1.

8. A data transmission method that is applicable to a user device, the method comprising:

disabling reception of a data symbol in an adjustment symbol in a target sub-frame in response to performing data reception of the target sub-frame containing the adjustment symbol, wherein:

the adjustment symbol is determined based on first information carried in a last sub-frame before performing a frequency adjustment or an uplink/downlink switching and second information carried in a first sub-frame after performing the frequency adjustment or the uplink/downlink switching;

the target sub-frame is the last sub-frame before performing the frequency adjustment or the uplink/downlink switching and/or the first sub-frame after performing the frequency adjustment or the uplink/downlink switching, and the adjustment symbol is an orthogonal frequency division multiplexing (OFDM) symbol used for an adjustment time of a narrowband frequency adjustment or an adjustment time of the uplink/downlink switching; and padding with a preset value at a position in analyzed data of the target sub-frame that corresponds to the adjustment symbol during data analysis.

9. The method of claim 8, wherein:

the last sub-frame before performing the frequency adjustment or the uplink/downlink switching is configured as the target sub-frame, and the adjustment symbol is configured as last two OFDM symbols of the last sub-frame;

the target sub-frame is the first sub-frame after performing the frequency adjustment or the uplink/downlink switching is configured as the target sub-frame, and the adjustment symbol is configured as first two OFDM symbols of the first sub-frame; or both the last sub-frame before performing the frequency adjustment or the uplink/downlink switching and the first sub-frame after performing the frequency adjustment or the uplink/downlink switching are configured as the target sub-frame, and the adjustment symbol is configured as a last OFDM symbol of the last sub-frame and a first OFDM symbol of the first sub-frame.

10. The method of claim 8, wherein, in response to information types of the first information and the second information being different, determining the adjustment symbol based on the first information carried in the last sub-frame before performing the frequency adjustment or the uplink/downlink switching and the second information carried in the first sub-frame after performing the frequency adjustment or the uplink/downlink switching further comprises:

determining the last sub-frame as the target sub-frame and last two OFDM symbols of the last sub-frame as the adjustment symbol in response to the first information being data information and the second information being control information; or determining the first sub-frame as the target sub-frame and first two OFDM symbols of the first sub-frame as the adjustment symbol in response to the first information being control information and the second information being data information.

11. The method of claim 8, wherein, in response to information types of the first information and the second information being identical, determining the adjustment symbol based on the first information carried in the last sub-frame before performing the frequency adjustment or the uplink/downlink switching and the second information carried in the first sub-frame after performing the frequency adjustment or the uplink/downlink switching further comprises:

determining the last sub-frame as the target sub-frame and last two OFDM symbols of the last sub-frame as the adjustment symbol;

determining the first sub-frame as the target sub-frame and first two OFDM symbols of the first sub-frame as the adjustment symbol; or determining the last sub-frame and the first sub-frame as the target sub-frame and a last OFDM symbol of the last sub-frame and a first OFDM symbol of the first sub-frame as the adjustment symbol.

12. The method of claim 8, wherein determining the adjustment symbol according to the first information carried in the last sub-frame before performing the frequency adjustment or the uplink/downlink switching and the second information carried in the first sub-frame after performing the frequency adjustment or the uplink/downlink switching further comprises:

determining the adjustment symbol based on a first symbol setting strategy corresponding to the first information and the second information, where the first symbol setting strategy is preset, and all combinations of the first information and the second information correspond to the first symbol setting strategy;

wherein the first symbol setting strategy includes:

the last sub-frame being the target sub-frame and the adjustment symbol being last two OFDM symbols of the last sub-frame;

the first sub-frame being the target sub-frame and the adjustment symbol being first two OFDM symbols of the first sub-frame; or the last sub-frame and the first sub-frame being the target sub-frame and the adjustment symbol being a last OFDM symbol of the last sub-frame and a first OFDM symbol of the first sub-frame.

13. The method of claim 8, wherein determining the adjustment symbol based on the first information carried in the last sub-frame before performing the frequency adjustment or the uplink/downlink switching and the second information carried in the first sub-frame after performing the frequency adjustment or the uplink/downlink switching further comprises:

determining the adjustment symbol based on a first symbol setting strategy corresponding to the first information and the second information, where the first symbol setting strategy is preset, different combinations of the first information and the second information correspond to different symbol setting strategies respectively, and the first symbol setting strategy is any one of the different symbol setting strategies;

wherein the first symbol setting strategy includes:

the last sub-frame being the target sub-frame and the adjustment symbol being last two OFDM symbols of the last sub-frame;

the first sub-frame being the target sub-frame and the adjustment symbol being first two OFDM symbols of the first sub-frame; or the last sub-frame and the first sub-frame being the target sub-frame and the adjustment symbol being a last OFDM symbol of the last sub-frame and a first OFDM symbol of the first sub-frame.

14. The method of claim 8, wherein padding with the preset value at the position in the analyzed data of the target sub-frame that corresponds to the adjustment symbol during the data analysis further comprises:

padding with zero or one at the position in the analyzed data of the target sub-frame after data analysis that corresponds to the adjustment symbol during the data analysis.

15. A data transmission device, applicable to a user device, comprising:

a processor; and a memory configured to store instructions executable by the processor, wherein the processor is configured to:

disable reception of a data symbol in an adjustment symbol in a target sub-frame in response to performing data reception of the target sub-frame containing the adjustment symbol, wherein:

the adjustment symbol is determined based on first information carried in a last sub-frame before performing a frequency adjustment or an uplink/downlink switching and second information carried in a first sub-frame after performing the frequency adjustment or the uplink/downlink switching;

the target sub-frame is the last sub-frame before performing the frequency adjustment or the uplink/downlink switching and/or the first sub-frame after performing the frequency adjustment or the uplink/downlink switching, and the adjustment symbol is an orthogonal frequency division multiplexing (OFDM) symbol used for an adjustment time of a narrowband frequency adjustment or an adjustment time of the uplink/downlink switching; and pad with a preset value at a position in analyzed data of the target sub-frame that corresponds to the adjustment symbol during data analysis.

16. The data transmission device of claim 15, wherein:

the last sub-frame before performing the frequency adjustment or the uplink/downlink switching is configured as the target sub-frame, and the adjustment symbol is configured as last two OFDM symbols of the last sub-frame;

the target sub-frame is the first sub-frame after performing the frequency adjustment or the uplink/downlink switching is configured as the target sub-frame, and the adjustment symbol is configured as first two OFDM symbols of the first sub-frame; or both the last sub-frame before performing the frequency adjustment or the uplink/downlink switching and the first sub-frame after performing the frequency adjustment or the uplink/downlink switching are configured as the target sub-frame, and the adjustment symbol is configured as a last OFDM symbol of the last sub-frame and a first OFDM symbol of the first sub-frame.

17. The data transmission device of claim 15, wherein, in response to information types of the first information and the second information being different, the processor is further configured to:

determine the last sub-frame as the target sub-frame and last two OFDM symbols of the last sub-frame as the adjustment symbol in response to the first information being data information and the second information being control information; or determine the first sub-frame as the target sub-frame and as first two OFDM symbols of the first sub-frame as the adjustment symbol in response to the first information being control information and the second information being data information.

* * * * *